United States Patent
Ootake

(10) Patent No.: US 9,671,881 B2
(45) Date of Patent: Jun. 6, 2017

(54) ELECTRONIC DEVICE, OPERATION CONTROL METHOD AND RECORDING MEDIUM

(71) Applicant: NEC CASIO MOBILE COMMUNICATIONS, LTD., Kanagawa (JP)

(72) Inventor: Masaaki Ootake, Saitama (JP)

(73) Assignee: NEC Corporation, Tokyo (JP)

( * ) Notice: Subject to any disclaimer, the term of this patent is extended or adjusted under 35 U.S.C. 154(b) by 283 days.

(21) Appl. No.: 14/357,473

(22) PCT Filed: Oct. 23, 2012

(86) PCT No.: PCT/JP2012/077328
§ 371 (c)(1),
(2) Date: May 9, 2014

(87) PCT Pub. No.: WO2013/080704
PCT Pub. Date: Jun. 6, 2013

(65) Prior Publication Data
US 2014/0313153 A1    Oct. 23, 2014

(30) Foreign Application Priority Data

Nov. 29, 2011 (JP) ................... 2011-259969
Sep. 27, 2012 (JP) ................... 2012-213881

(51) Int. Cl.
G06F 3/041        (2006.01)
G06F 1/16         (2006.01)
(Continued)

(52) U.S. Cl.
CPC ............ G06F 3/041 (2013.01); G06F 1/1692 (2013.01); H04M 1/72522 (2013.01); *G06F 3/0488* (2013.01); *H04M 2250/22* (2013.01)

(58) Field of Classification Search
CPC .......... H04M 2250/22; H04M 1/72522; G06F 3/0488; G06F 3/041; G06F 1/1692
See application file for complete search history.

(56) References Cited

U.S. PATENT DOCUMENTS

2009/0049395 A1*  2/2009  Lee ................. H04N 7/147
                                                715/765
2010/0056220 A1*  3/2010  Oh .................. G06F 1/1616
                                                455/566

(Continued)

FOREIGN PATENT DOCUMENTS

JP    2003-150308 A    5/2003
JP    2003-333157 A    11/2003

(Continued)

OTHER PUBLICATIONS

International Search Report corresponding to PCT/JP2012/077328, Jan. 8, 2013, 1 page.

*Primary Examiner* — Abbas Abdulselam
(74) *Attorney, Agent, or Firm* — Wilmer Cutler Pickering Hale and Dorr LLP

(57) ABSTRACT

An electronic device that accepts an input and executes operation includes: a first detection unit that detects a touch position on a first surface among surfaces included on the electronic device; a second detection unit that detects a touch operation on a second surface different from the first surface among the surfaces included on the electronic device; and a control unit that sets a reference position on the first surface or the second surface in response to the touch operation on the second surface, and controls the operation of the electronic device on the basis of a relative positional relationship between the reference position and the touch position on the first surface.

16 Claims, 15 Drawing Sheets

(51) Int. Cl.
*H04M 1/725* (2006.01)
*G06F 3/0488* (2013.01)

(56) References Cited

U.S. PATENT DOCUMENTS

| | | |
|---|---|---|
| 2010/0275150 A1 | 10/2010 | Chiba et al. |
| 2011/0074716 A1 | 3/2011 | Ono |
| 2011/0157055 A1* | 6/2011 | Tilley .................. G06F 3/017 |
| | | 345/173 |

FOREIGN PATENT DOCUMENTS

| | | |
|---|---|---|
| JP | 2007-334827 A | 12/2007 |
| JP | 2011-70609 A | 4/2011 |
| JP | 2011-76233 A | 4/2011 |
| WO | WO-200944770 A1 | 4/2009 |

* cited by examiner

IN THE CASE WHERE TOUCH POINT ON FRONT SURFACE IS MOVING CIRCULARLY CENTERED ON TOUCH POINT ON REAR SURFACE.

ELECTRONIC DEVICE, OPERATION CONTROL METHOD AND RECORDING MEDIUM

CROSS-REFERENCE TO RELATED APPLICATIONS

The present application is a national stage application of International Application No. PCT/JP2012/077328 entitled "Electronic Device, Operation Control Method and Recording Medium," filed on Oct. 23, 2012, which claims the benefit of priority from Japanese Patent Application Nos. JP2011-259969, filed on Nov. 29, 2011 and JP2012-213881, filed on Sep. 27, 2012, the disclosures of which are incorporated herein in their entirety by reference thereto.

TECHNICAL FIELD

The present invention relates to an electronic device, an operation control method and a recording medium and, for instance, an electronic device including a touch panel, an operation control method and a recording medium.

BACKGROUND ART

In recent years, mobile devices including touch panels have become widespread.

Patent Literature 1 describes an information terminal device including a touch panel, the device including: a monitor on which objects are displayed; a first touch panel provided on a front surface of the monitor; and a second touch panel provided on a rear surface of the monitor.

The information terminal device described in Patent Literature 1 receives, through the first touch panel, an input for selecting an object displayed on the monitor, and receives, through the second touch panel, an input for operating the selected object (e.g. an input for moving or enlarging an object).

CITATION LIST

Patent Literature

Patent Literature 1: JP2011-70609A

SUMMARY OF INVENTION

Technical Problem

At present, along with widespread use of mobile devices that include touch panels, a novel input scheme that uses a touch panel is desired.

It is an object of the present invention to provide an electronic device, an operation control method and a recording medium that are capable of solving the problem.

Solution to Problem

An electronic device according to the present invention is an electronic device accepting an input and executing an operation, the device including:

first detection means that detects a touch position on a first surface among surfaces included on the electronic device;

second detection means that detects a touch operation on a second surface that is different from the first surface among the surfaces included on the electronic device; and control means that sets a reference position on the first surface or the second surface in response to the touch operation on the second surface, and controls the operation of the electronic device on the basis of a relative positional relationship between the reference position and the touch position on the first surface.

An electronic device according to the present invention is an electronic device accepting an input and executing an operation, the device including:

first detection means that detects a touch operation on a first surface among surfaces included on the electronic device;

second detection means that detects a touch operation on a second surface that is different from the first surface among the surfaces included on the electronic device; and control means that controls the operation of the electronic device on the basis of a temporal difference between timing when the first detection means detects the touch operation on the first surface and timing when the second detection means detects the touch operation on the second surface.

An electronic device according to the present invention is an electronic device accepting an input and executing an operation, the device including:

first detection means that detects a touch position on a first surface among surfaces included on the electronic device;

second detection means that detects a touch operation on a second surface that is different from the first surface among the surfaces included on the electronic device; and control means that sets, as a reference position, a touch position on the first surface detected first by the first detection means in a continuous detection situation where the second detection means is detecting a continuous touch operation on the second surface, and controls the operation of the electronic device on the basis of a relative positional relationship between a touch position on the first surface secondarily detected by the first detection means in the continuous detection situation and the reference position.

An operational control method according to the present invention is an operational control method in an electronic device accepting an input and executing an operation, the method including:

detecting a touch position on a first surface among surfaces included on the electronic device;

detecting a touch operation on a second surface that is different from the first surface among the surfaces included on the electronic device; and setting a reference position on the first surface or the second surface in response to the touch operation on the second surface, and controlling the operation of the electronic device on the basis of a relative positional relationship between the reference position and the touch position on the first surface.

An operational control method according to the present invention is an operational control method in an electronic device accepting an input and executing an operation, the method including:

detecting a touch operation on a first surface among surfaces included on the electronic device;

detecting a touch operation on a second surface that is different from the first surface among the surfaces included on the electronic device; and controlling the operation of the electronic device on the basis of a temporal difference between timing of detecting the touch operation on the first surface and timing of detecting the touch operation on the second surface.

An operational control method according to the present invention is an operational control method in an electronic device accepting an input and executing an operation, the method including:

detecting a touch position on a first surface among surfaces included on the electronic device;

detecting a touch operation on a second surface that is different from the first surface among the surfaces included on the electronic device; and setting, as a reference position, the touch position on the first surface detected first in a continuous detection situation of detecting a continuous touch operation on the second surface, and controlling the operation of the electronic device on the basis of a relative positional relationship between a touch position on the first surface secondarily detected in the continuous detection situation and the reference position.

A recording medium according to the present invention is a computer-readable recording medium storing a program causing a computer to execute:

a first detection procedure of detecting a touch position on a first surface among surfaces included on the computer;

a second detection procedure of detecting a touch operation on a second surface that is different from the first surface among the surfaces included on the computer; and a control procedure of setting a reference position on the first surface or the second surface in response to the touch operation on the second surface, and controlling the operation of the electronic device on the basis of a relative positional relationship between the reference position and the touch position on the first surface.

A recording medium according to the present invention is a computer-readable recording medium storing a program causing a computer to execute:

a first detection procedure of detecting a touch position on a first surface among surfaces included on the computer;

a second detection procedure of detecting a touch operation on a second surface that is different from the first surface among the surfaces included on the computer; and a control procedure of controlling the operation of the electronic device on the basis of a temporal difference between timing of detecting a touch operation on the first surface and timing of detecting the touch operation on the second surface.

A recording medium according to the present invention is a computer-readable recording medium storing a program causing a computer to execute:

a first detection procedure of detecting a touch position on a first surface among surfaces included on the computer;

a second detection procedure of detecting a touch operation on a second surface that is different from the first surface among the surfaces included on the computer; and a control procedure of setting, as a reference position, the touch position on the first surface detected first in a continuous detection situation of detecting a continuous touch operation on the second surface, and controlling the operation of the electronic device on the basis of a relative positional relationship between a touch position on the first surface secondarily detected in the continuous detection situation and the reference position.

Advantageous Effects of Invention

The present invention can provide a novel input scheme using a touch panel.

DESCRIPTION OF EXEMPLARY EMBODIMENTS

Exemplary embodiments are hereinafter described with reference to the drawings.

First Exemplary Embodiment

Figure 1A:
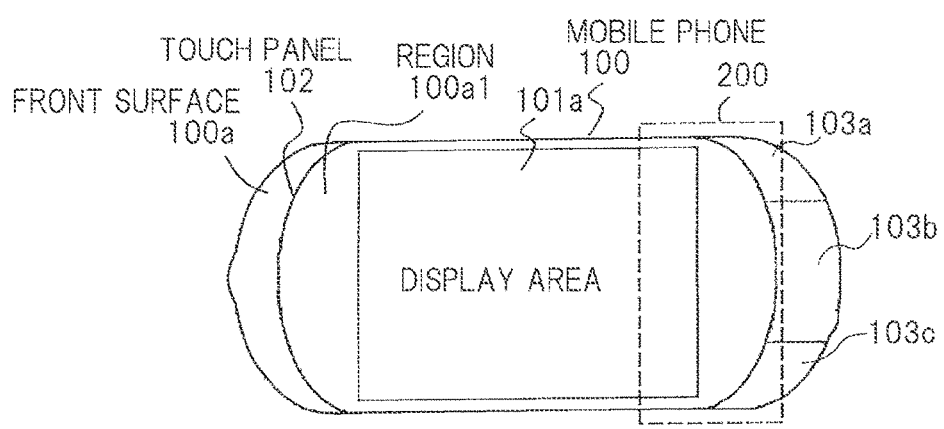
FIG. 1A is a diagram showing an appearance of mobile phone 100, which is an example of an electronic device of an exemplary embodiment.
Figure 1B:
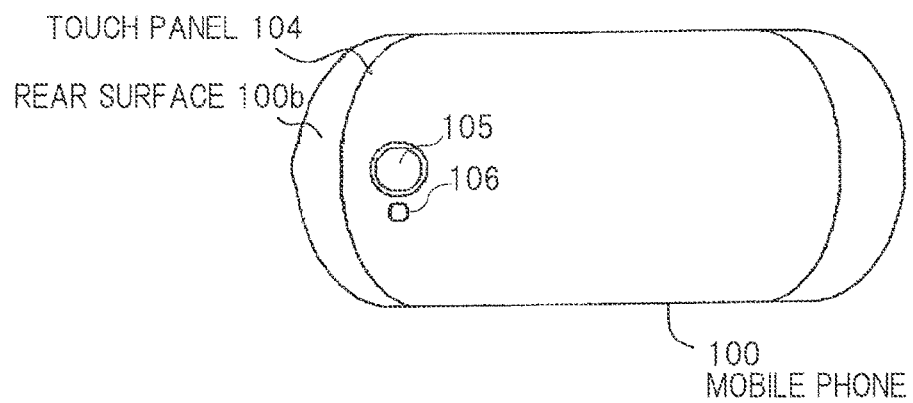
FIG. 1B is a diagram showing an appearance of mobile phone 100, which is an example of an electronic device of an exemplary embodiment.

FIGS. 1A and 1B are diagrams showing an appearance of mobile phone 100, which is an example of an electronic device of a first exemplary embodiment. More specifically, FIG. 1A is a diagram showing an appearance of the front of mobile phone 100. FIG. 1B is a diagram showing an appearance of the rear of mobile phone 100.

Note that the electronic device is not limited to a mobile phone. Alternatively, the device may be appropriately replaced. For instance, a PDA (personal digital assistants), a PC (personal computer) or a game player may be adopted.

In FIG. 1A, front surface 100a of mobile phone 100 is an example of a first surface.

On front surface 100a there are provided display area 101a, touch panel 102, clear key 103a, enter key 103b, and menu key 103c.

Display area 101a is an example of a screen.

Touch panel 102 is an example of first detection means and a first touch panel. Touch panel 102 is provided on region 100a1 adjacent to display area 101a and on display area 101a, these areas being included in front surface 100a. Touch panel 102 detects a touch position on touch panel 102.

Each of clear key 103a, enter key 103b, and menu key 103c is a hard key.

In FIG. 1B, rear surface 100b of mobile phone 100 is a rear surface of front surface 100a. Rear surface 100b is an example of a second surface.

On rear surface 100b there are provided touch panel 104, camera 105, and LED (light emitting diode) 106.

Touch panel 104 is an example of second detection means and a second touch panel. Touch panel 104 detects a touch position on touch panel 104 as a touch operation on touch panel 104.

Camera 105 is a camera module that includes a lens and an image pickup element.

LED 106 functions as a light for camera 105.

As shown in FIGS. 1A and 1B, in mobile phone 100, touch panels 102 and 104 are provided on both the front and rear surfaces of mobile phone 100. In mobile phone 100, areas (e.g., a region adjacent to display area 101a) other than display area 101a are also used as an input acceptor.

Figure 2:
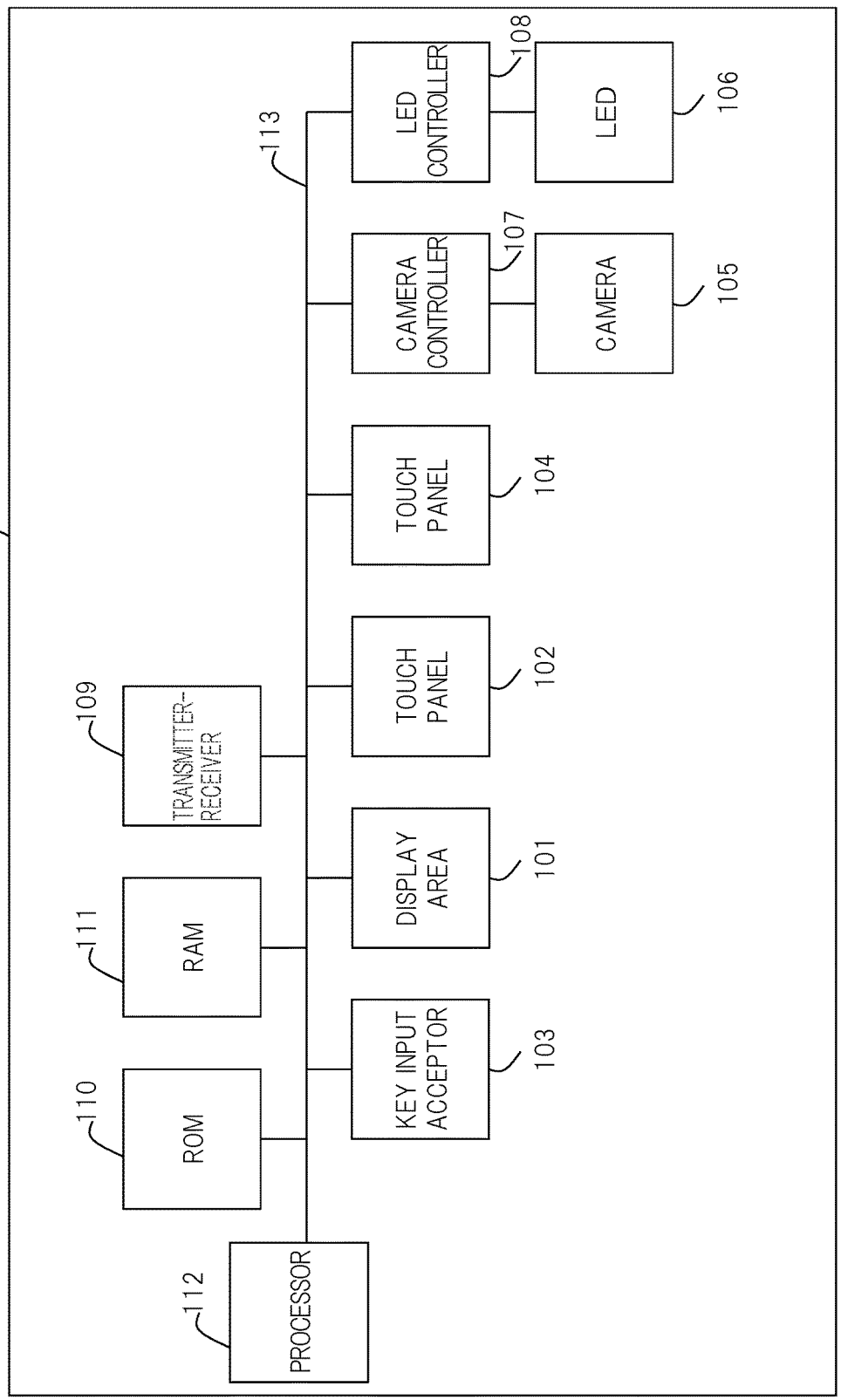
FIG. 2 is a block diagram showing a configuration of mobile phone 100.

FIG. 2 is a block diagram showing a configuration of mobile phone 100. Note that, in FIG. 2, the same reference signs are assigned to configurational elements identical to those shown in FIG. 1A or 1B.

In FIG. 2, mobile phone 100 includes display 101, touch panel 102, key input acceptor 103, touch panel 104, camera 105, LED 106, camera controller 107, LED controller 108, transmitter-receiver 109, ROM (read only memory) 110, RAM (random access memory) 111, processor 112, and bus 113.

Display 101 includes display area 101a shown in FIG. 1A, and executes displaying of various objects in display area 101a. For instance, display 101 executes: displaying a camera function instruction for illustrating camera functions; displaying of an image that is being taken by camera 105; displaying confirmation of the image taken by camera 105; displaying various pieces of information on mobile phone 100; and displaying a user interface. Display 101 is, for instance, an LCD (liquid crystal display). Note that display 101 is not limited to an LCD. Alternatively, the display may be appropriately replaced.

Key input acceptor 103 includes at least one hard key, and receives key information that is input by a user. In this exemplary embodiment, key input acceptor 103 includes clear key 103a, enter key 103b, and menu key 103c. Note that the number and types of hard keys included in key input acceptor 103 are not limited to three but may be appropriately changed.

Camera controller 107 controls camera 105, and receives output data of camera 105.

LED controller 108 controls turning on and off LED 106, which functions as a light for camera 105.

Transmitter-receiver 109 transmits and receives data (e.g., audio data or image data) to and from a base station (not shown) in a mobile communication system.

ROM 110 stores various control programs for image analysis, touch panel control, camera control, LED control, etc. and a determination program for determining the relationship between positions where each of touch panels 102 and 104 is touched, the programs being executed by processor 112.

RAM 111 is a region where control programs and data that are required by processor 112 for executing processes are deployed.

Processor 112 is an example of control means.

Processor 112 includes, for instance, a CPU (central processing unit) and a DSP (digital signal processor). Processor 112 is connected to each element in mobile phone 100 via bus 113.

Processor 112 achieves various functions by reading and executing programs in ROM 110.

Processor 112 sets a reference position on front surface 100a or rear surface 100b in response to a touch operation on rear surface 100b. For instance, processor 112 sets a reference position in response to a touch position on rear surface 100b. In this exemplary embodiment, processor 112 sets a touch position on rear surface 100b as a reference position.

The reference position is not limited to a touch position on rear surface 100b. For instance, the reference position may be a position that is preset on front surface 100a, a position that is preset on rear surface 100b, or a position that is set on front surface 100a in response to a touch position on rear surface 100b.

When processor 112 sets a reference position, processor 112 controls the operation of mobile phone 100 on the basis of the relative positional relationship between the reference position and the touch position on front surface 100a.

When the touch position on rear surface 100b is set as a reference position, processor 112 controls the operation of mobile phone 100 on the basis of the relative positional relationship between a touch position on front surface 100a by a user and a touch position on rear surface 100b by the user.

In this exemplary embodiment, processor 112 sets a reference position on the basis of an output of touch panel 104 that represents a touch position on touch panel 104 by the user. Processor 112 identifies a relative positional relationship between the touch position on front surface 100a and the touch position on rear surface 100b on the basis of an output of touch panel 102 that represents a touch position on touch panel 102 by the user and an output of touch panel 104 that represents a touch position on touch panel 104 by the user. Processor 112 identifies an input into mobile phone 100 on the basis of the identified relative positional relationship. Processor 112 controls the operation of mobile phone 100 on the basis of the identified input.

Next, an operation is described.

First, operation of setting, on touch panel 102, an area for accepting a touch input pertaining to an operation on mobile phone 100 in response to a touch position on touch panel 104 is described.

Figure 3:
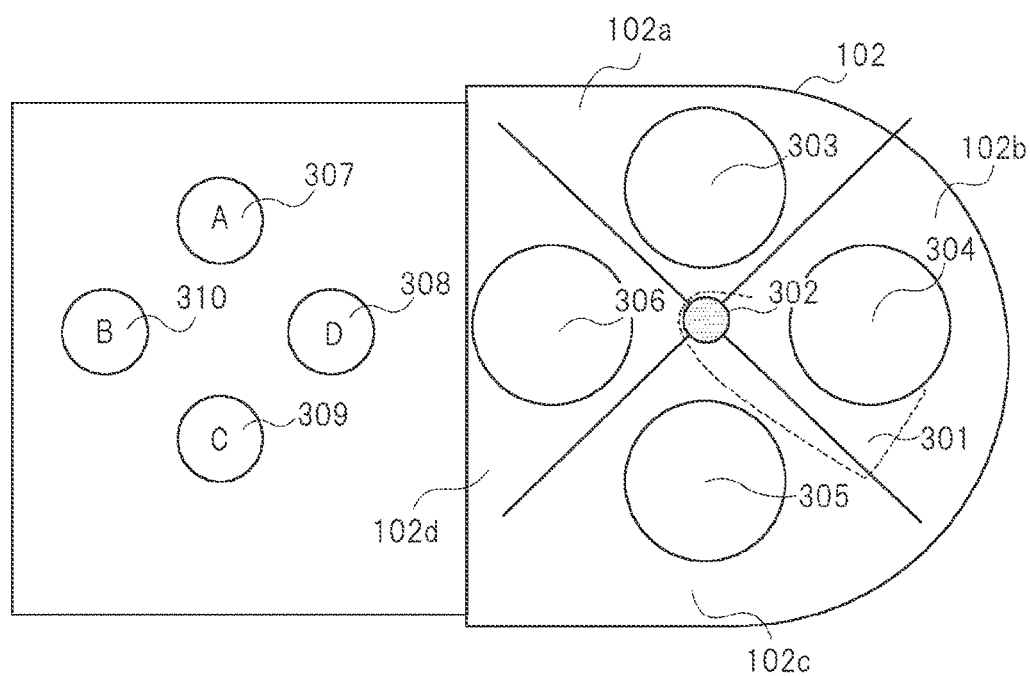
FIG. 3 is a diagram schematically showing a part of mobile phone 100.

FIG. 3 is a diagram schematically showing a region where touch panel 102 exists in part 200 of mobile phone 100 shown in FIG. 1A.

On touch panels 102 and 104, XY-coordinates are defined. The XY-coordinates on touch panel 104 are arranged so as to have a mirror symmetrical relationship to the XY-coordinates on touch panel 102.

In FIG. 3, touch panel 104 exists on the rear side opposite to touch panel 102.

Here, it is provided that finger 301 comes into contact with touch panel 104 provided on rear surface 100b. In FIG. 3, a position, with which finger 301 is in contact, is represented as point 302.

When finger 301 comes into contact with touch panel 104 on point 302, processor 112 sets a circular region defined to have a predetermined radius centered on a point (hereinafter, referred to as "an identified point") on touch panel 102 that is identified with reference to coordinates identical to the coordinates of point 302 on touch panel 104. Subsequently, processor 112 divides the circular region into four sections centered on the identified point to set four regions 102a to 102d (see FIG. 3).

Subsequently, processor 112 sets areas 303 to 306 where a touch input pertaining to an operation of mobile phone 100 is accepted, on respective four regions 102a to 102d.

Note that touch panel 102 is mounted on a substantially entire region of front surface 100a. Accordingly, the area capable of sensing a touch input pertaining to an operation of mobile phone 100 is wide. Here, four areas are shown for the sake of illustration.

Subsequently, processor 112 displays input guides 307 to 310 on display 101. In this exemplary embodiment, "A" button 307, "D" button 308, "C" button 309, and "B" button 310 are displayed as four input guides.

Next, the overall operation of this exemplary embodiment is described.

Figure 4:
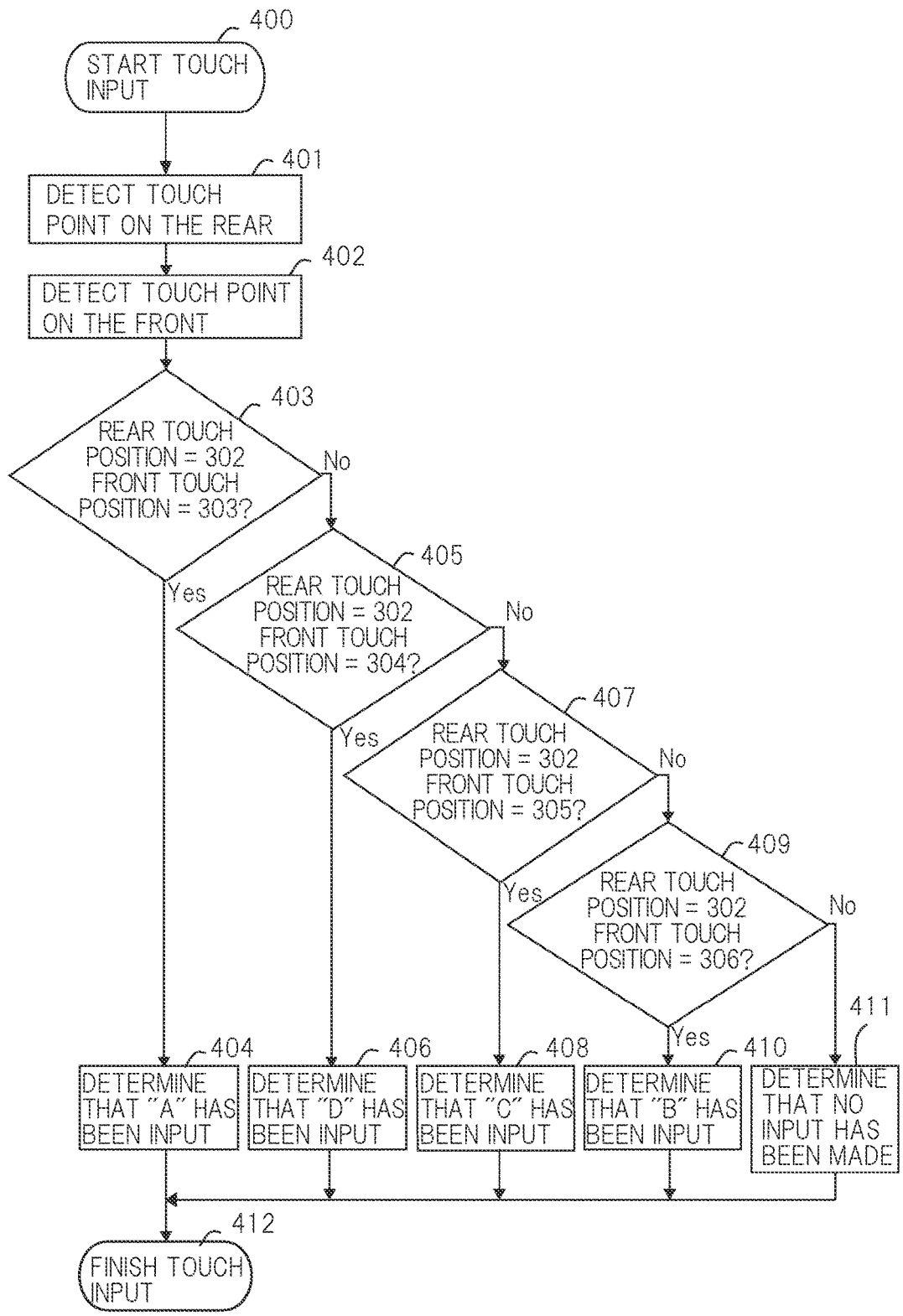
FIG. 4 is a flowchart for illustrating operation pertaining to an input.

FIG. 4 is a flowchart for illustrating the operation pertaining to input determination in this exemplary embodiment.

In step 400, a touch input is started, and then the following processes are executed.

First, in step 401, touch panel 104 detects a position (point) where rear surface 100b is touched. Hereinafter, the touched position on rear surface 100b is defined as point 302. Touch panel 104 notifies processor 112 of a detection result.

After point 302 is identified, processor 112 sets a circular region on touch panel 102 as described with reference to FIG. 3, the circular region being defined to have a predetermined radius centered on the identified point identified by coordinates identical to the coordinates of point 302 on touch panel 104. Subsequently, processor 112 divides the circular region on touch panel 102 into four sections centered on the identified point to set four regions 102a to 102d. Subsequently, processor 112 sets areas 303 to 306 for accepting a touch input pertaining to an operation on mobile phone 100 in respective four regions 102a to 102d.

Subsequently, in step 402, touch panel 102 detects touched position (point) on front surface 100a. Touch panel 102 notifies processor 112 of a detection result.

Hereinafter, processor 112 identifies an input pertaining to an operation on mobile phone 100 on the basis of a relative positional relationship between the touch position on rear surface 100b and the touch position on front surface 100a.

In step 403, if the touch position on rear surface 100b is point 302 and the touch position on front surface 100a is area 303, processor 112 determines that input guide 307 (input "A" in FIG. 3) on the upper side has been selected from among input guides 307 to 310.

Subsequently, processor 112 identifies an input assigned to input guide 307 in step 404 (input "A" in FIG. 3), and finishes the touch input in step 412.

In step 405, if the touch position on rear surface 100b is point 302 and the touch position on front surface 100a is area 304, processor 112 determines that input guide 308 (input "D" in FIG. 3) on the right side has been selected from among input guides 307 to 310.

Subsequently, processor 112 identifies an input assigned to input guide 308 in step 406 (input "D" in FIG. 3), and finishes the touch input in step 412.

In step 407, if the touch position on rear surface 100b is point 302 and the touch position on front surface 100a is area 305, processor 112 determines that input guide 309 (input "C" in FIG. 3) on the lower side has been selected from among input guides 307 to 310.

Subsequently, processor 112 identifies an input assigned to input guide 309 in step 408 (input "C" in FIG. 3), and finishes the touch input in step 412.

In step 409, if the touch position on rear surface 100b is point 302 and the touch position on front surface 100a is area 306, processor 112 determines that input guide 310 (input "B" in FIG. 3) on the left side has been selected from among input guides 307 to 310.

Subsequently, processor 112 identifies an input assigned to input guide 310 in step 410 (input "B" in FIG. 3), and finishes the touch input in step 412.

If the relative positional relationship between the touch position on rear surface 100b and the touch position on front surface 100a does not fall into any of steps 403, 405, 407 and 409, processor 112 determines that no input has been made in step 411 and then finishes the touch input in step 412.

Figure 5:
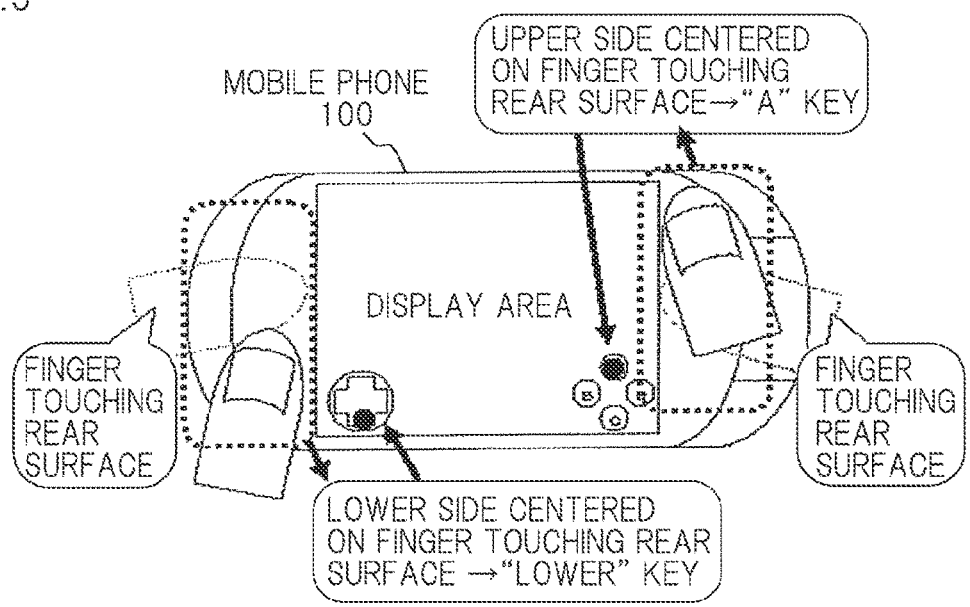
FIG. 5 is a diagram showing an example of operation of this exemplary embodiment described with reference to FIG. 4.

FIG. 5 is a diagram showing an example of an operation of this exemplary embodiment described with reference to FIG. 4.

Subsequently, processor 112 controls the operation of mobile phone 100 on the basis of the input that is determined according to the relative positional relationship between the touch position on rear surface 100b and the touch position on front surface 100a. For instance, processor 112 changes the display on display area 101a on the basis of the input.

Next, advantageous effects of this exemplary embodiment are described.

According to this exemplary embodiment, touch panel 102 detects a touch position on front surface 100a of mobile phone 100. Touch panel 104 detects a touch operation on rear surface 100b of mobile phone 100. Processor 112 sets a reference position on front surface 100a or rear surface 100b in response to the touch operation on rear surface 100b, and controls the operation of mobile phone 100 on the basis of the relative positional relationship between the reference position and touch position on front surface 100a.

In this exemplary embodiment, the relative positional relationship between a reference position set in response to a touch operation on rear surface 100b and a touch position on front surface 100a are used as an input used for controlling the operation of mobile phone 100. The absolute position of a touch position is not considered.

Accordingly, the user can easily make an input at a position desired by the user. This allows a touch position for input to move in accordance with the size of the hand of the user.

Figure 6:
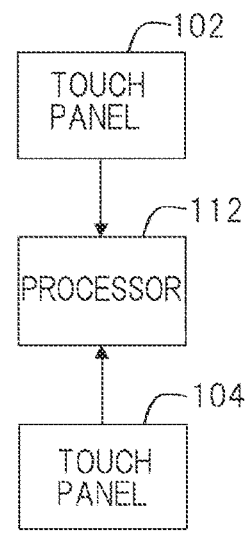
FIG. 6 is a diagram showing an electronic device that includes touch panels 102 and 104 and processor 112.

An electronic device that includes touch panels 102 and 104 and processor 112 can also generate these advantageous effects. FIG. 6 is a diagram showing an electronic device that includes touch panels 102 and 104 and processor 112.

Furthermore, in this exemplary embodiment, touch panel 104 detects a touch position on rear surface 100b as a touch operation on rear surface 100b. Processor 112 sets a reference position in response to the touch position on rear surface 100b.

Accordingly, the reference position can be changed in response to a touch position on rear surface 100b.

Furthermore, touch panel 104 detects a touch position on rear surface 100b of mobile phone 100 as a reference position. Processor 112 controls the operation of mobile phone 100 on the basis of the relative positional relationship between the touch position on front surface 100a and the touch position on rear surface 100b.

Accordingly, the operation of mobile phone 100 can be changed by changing the relative positional relationship between the touch position on front surface 100a and the touch position on rear surface 100b.

Furthermore, an operation button is not necessarily displayed on display area 101a. Accordingly, display content other than the operation button (e.g., images representing characters and moving images) can be largely displayed on display area 101a. A guide indication for performing an operation may be executed. In this case, the guide display can be configured to be small, and there is no need to overlay a finger or a thumb on the guide display. Accordingly, difficulty in view can be avoided.

The user can confirm the positional relationship between a touch position on touch panel 104 and a touch position of a finger or a thumb on touch panel 102 through the positional relationship of the finger or the thumb of the user. Accordingly, the deviation of the touch position can be easily recognized through the positional relationship of the finger or the thumb of the user.

In this exemplary embodiment, processor 112 identifies an input into mobile phone 100 on the basis of the relative positional relationship between the touch position on front surface 100a and the touch position on rear surface 100b, and controls the operation of mobile phone 100 on the basis of the identified input.

Accordingly, the relative positional relationship between the touch position on front surface 100a and the touch position on rear surface 100b is used as information for identifying an input into mobile phone 100. The absolute position of the touch position is not considered. Thus, the user can easily perform a touch input at a position desired by the user.

In this exemplary embodiment, touch panels 102 and 104 are provided on two surfaces, which are the front and rear surfaces of mobile phone 100.

Accordingly, the user regards, as a reference, a part which is touch panel 104 mounted on rear surface 100b and with which the user is in contact (e.g., index finger), and can perform an input using the positional relationship between the reference and a part which is touch panel on front surface 100a and with which the user is in contact (e.g., thumb).

In this exemplary embodiment, touch panel 102 is provided at least in region 100a1 adjacent to display area 101a on front surface 100a.

Figure 7:
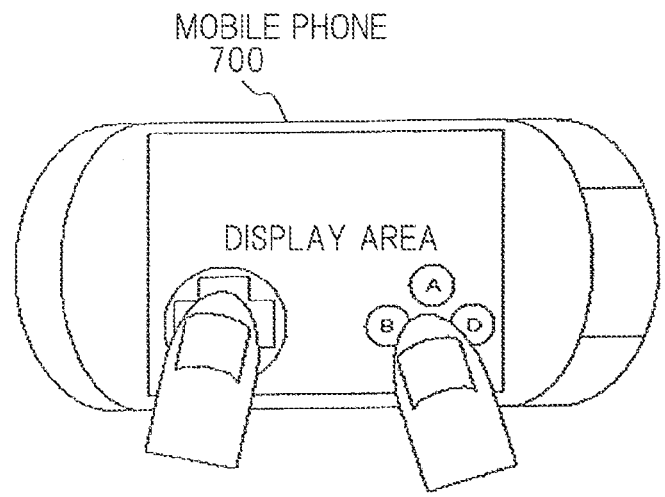
FIG. 7 is a diagram showing a reference example.

Accordingly, the user can perform a touch operation for input in a region other than display area 101a through a finger or a thumb. Accordingly, difficulty in viewing the display in display area 101a due to a finger or a thumb being placed on the operation button displayed on display area 101a can be prevented. FIG. 7 is a diagram showing mobile phone 700 (a reference example) having a mode where the user operates an operation button displayed on display area 101a by using a finger or a thumb. A touch operation for input performed in a region other than display area 101a can prevent display area 101a from being made dirty with the finger or the thumb.

In this exemplary embodiment, touch panel 102 is provided at least on display area 101a. Accordingly, an input can be made into mobile phone 100 even on display area 101a.

Furthermore, according to this exemplary embodiment, as with areas 303 to 306 shown in FIG. 3, a certain extent can be secured in an input area. Accordingly, an I/F (interface) facilitating an input can be configured irrespective of the sizes of hands. In the case where areas 303 to 306 are out of display area 101a, even increase in sizes of areas 303 to 306 will not interfere with another display in display area 101a.

Note that in the case of determining an input I/F, the user may touch touch panel 104 on rear surface 100b once, RAM 111 functioning as storing means may store the touch position (reference position), and processor 112 may identify an input into mobile phone 100 on the basis of the relative positional relationship between the touch position on touch panel 102 and the touch position (reference position) on touch panel 104 in RAM 111. In this case, the control is such that a position corresponding to point 302 is fixed when determining the input I/F.

Note that the case of determining the input I/F indicates the timing of changing the input I/F, such as the case before starting an input operation or the case of pressing a certain hard key.

In this case, movement of a touch position (a place corresponding to point 302) on the rear surface due to another finger or thumb coming into contact with touch panel 104 on rear surface 100b during input operation can be prevented.

After the touch position is stored in RAM 111, processor 112 may turn off touch panel 104 on rear surface 100b. Touch panel 104 on side surface 100b is turned on only when the input I/F is determined, thereby allowing power consumption to be reduced.

In the foregoing exemplary embodiment, processor 112 may identify an input into mobile phone 100 on the basis of change in the relative positional relationship between the touch position on front surface 100a and the touch position on rear surface 100b.

Figure 8:
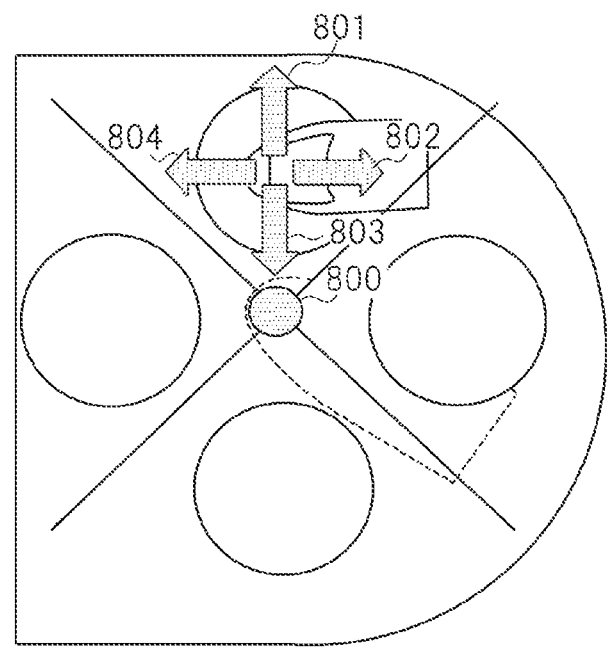
FIG. 8 is a diagram for illustrating an operation for identifying an input into mobile phone 100 on the basis of change in a relative positional relationship between a touch position on front surface 100a and a touch position on rear surface 100b.

FIG. 8 is a diagram for illustrating an operation of identifying an input into mobile phone 100 on the basis of change in the relative positional relationship between a touch position on front surface 100a and a touch position on rear surface 100b. FIG. 8 shows an example of identifying an input on the basis of the amount of movement of the touch position on front surface 100a with reference to the touch position on rear surface 100b.

As shown in FIG. 8, provided that the touch position on rear surface 100b is point 800, movement 801 of the touch position on front surface 100a that increases the distance from point 800, movement 803 of the touch position on front surface 100a that reduces the distance from point 800, right parallel movement of the touch position on front surface 100a or clockwise circular motion 802 of the touch position on front surface 100a that is centered on point 800, and left parallel movement of the touch position on front surface 100a or counterclockwise circular motion 804 of the touch position on front surface 100a that is centered on point 800, may be used as an input method (change in relative positional relationship).

In the case where the touch position on rear surface 100b overlaps on camera 105 or the like, this method can be considered to be adopted.

In this exemplary embodiment, the example of identifying any of four inputs (e.g., inputs "A" to "D") on the basis of the relative positional relationship between the touch position on front surface 100a and the touch position on rear surface 100b has been described. However, the number of inputs capable of identifying based on the relative positional relationship is not limited to four. Alternatively, the number may be appropriately changed.

Figure 9:
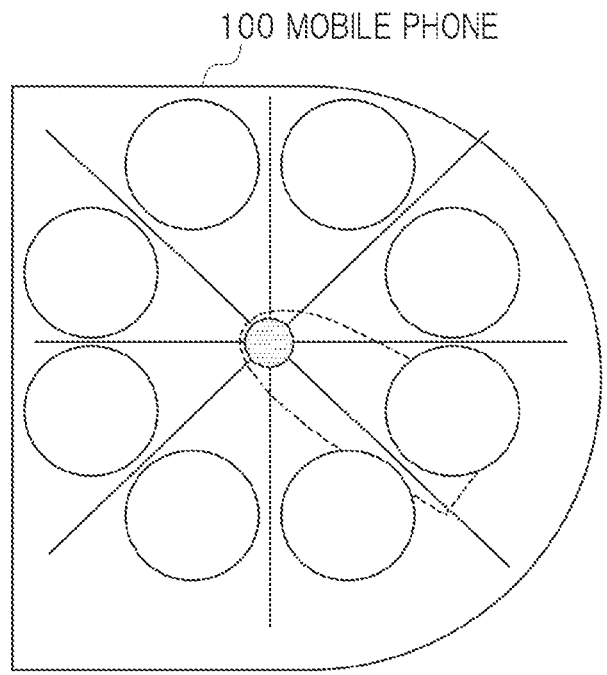
FIG. 9 is a diagram showing an example where the number of inputs capable of being identified on the basis of a relative positional relationship is configured to be eight.

FIG. 9 is a diagram showing an example where the number of inputs, which can be identified based on the relative positional relationship, is eight.

In this exemplary embodiment, for instance, a game displayed on display area 101a may be operated in response to the input identified by processor 112. An ordinary display operation, such as screen-scrolling on a browser displayed on display area 101a, may be performed.

In the foregoing exemplary embodiment, the point identified by coordinates identical to the coordinates of point 302 on touch panel 104 is used as the identified point (point in a state without operation) to be set on touch panel 102.

However, the identified point may be a point that deviates from point 302 on touch panel 104 by a prescribed distance on the coordinates. For instance, at an initial setting, the prescribed distance is set, and a point that deviates from the coordinates of point 302 by the prescribed distance is set as the identified point.

The identified point may be a circular region centered on the coordinates of point 302. For instance, at an initial setting, the radius of the identified point, which is a circular region, is set, and the circular region having the set radius centered on the coordinates of point 302 is set as the identified point. In this case, the region set as the identified point functions as a margin for preventing operation and preventing operating error.

In the foregoing exemplary embodiment, the XY-coordinates of touch panel 104 are provided to have a mirror symmetric relationship to the XY-coordinates of touch panel 102. Alternatively, the XY-coordinates of touch panel 104 may be acquired by multiplying what is mirror-symmetric to the XY-coordinates of touch panel 102 by a certain coefficient. In this case, even if the sizes of touch panel 102 and touch panel 104 are different, the sizes of touch panel 102 and touch panel 104 can be configured to be virtually coincident with each other on the XY-coordinates.

In the foregoing exemplary embodiment, processor 112 sets, on touch panel 102, areas 303 to 306 for accepting a touch input pertaining to an operation on mobile phone 100, with reference to the touch position on touch panel 104. Alternatively, processor 112 may set, on touch panel 104, areas 303 to 306 for accepting a touch input on mobile phone 100, with reference to the touch position on touch panel 102.

It seems that the foregoing exemplary embodiment is effective for action games and the like, which are realized by software (applications) executed by mobile phone 100, and that require quick operations.

As to implementation that does not make the screen dirty, the exemplary embodiment can be used as an input method in the case of operating a touch panel on the border of a screen.

Second Exemplary Embodiment

Figure 10A:
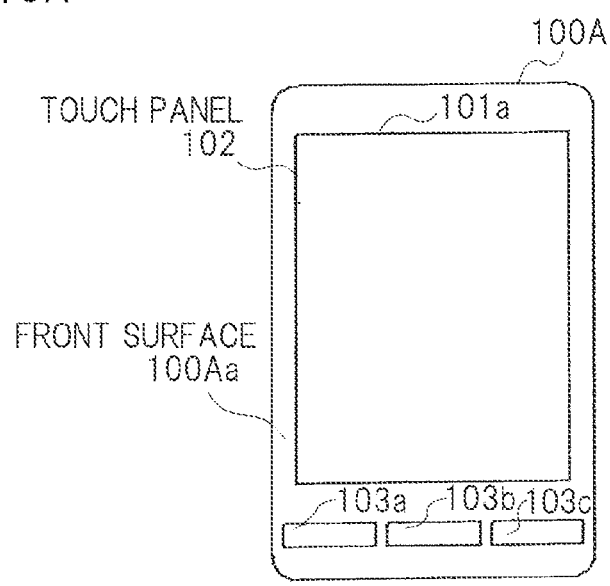
FIG. 10A is a diagram showing an appearance of mobile phone 100A that is an example of an electronic device of a second exemplary embodiment.
Figure 10B:
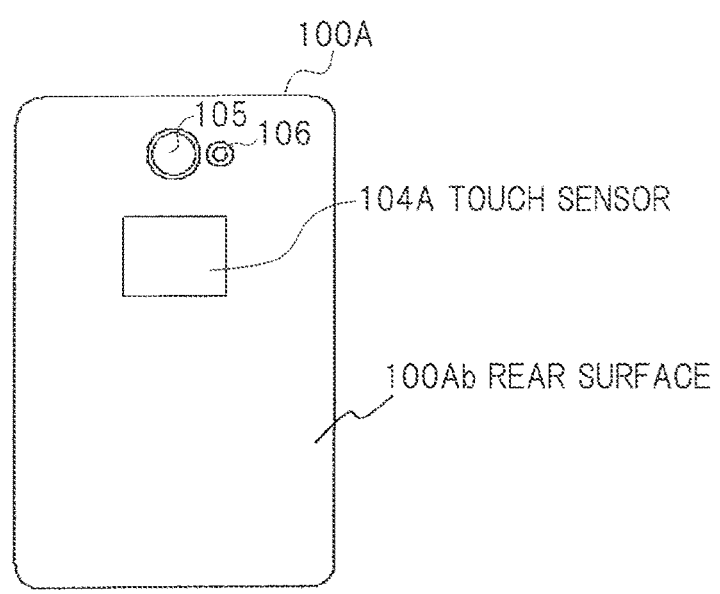
FIG. 10B is a diagram showing an appearance of mobile phone 100A that is the example of the electronic device of the second exemplary embodiment.

FIGS. 10A and 10B are diagrams showing the appearance of mobile phone 100A, which is an example of an electronic device of a second exemplary embodiment. More specifically, FIG. 10A is a diagram showing the appearance of the front of mobile phone 100A. FIG. 10B is a diagram showing the appearance of the rear of mobile phone 100A. In FIG. 10A or 10B, the same signs are assigned to configurational elements identical to those shown in FIG. 1A or 1B.

In FIG. 10A, front surface 100Aa of mobile phone 100A is an example of the first surface.

On front surface 100Aa there are provided display area 101a, touch panel 102, clear key 103a, enter key 103b, and menu key 103c.

In FIG. 10B, rear surface 100Ab of mobile phone 100A is a rear surface opposite to front surface 100Aa. Rear surface 100Ab is an example of a second surface.

On rear surface 100Ab there are provided touch sensor 104A, camera 105, and LED 106.

Touch sensor 104A is an example of second detection means. Touch sensor 104A detects a touch operation on touch sensor 104A.

Figure 11:
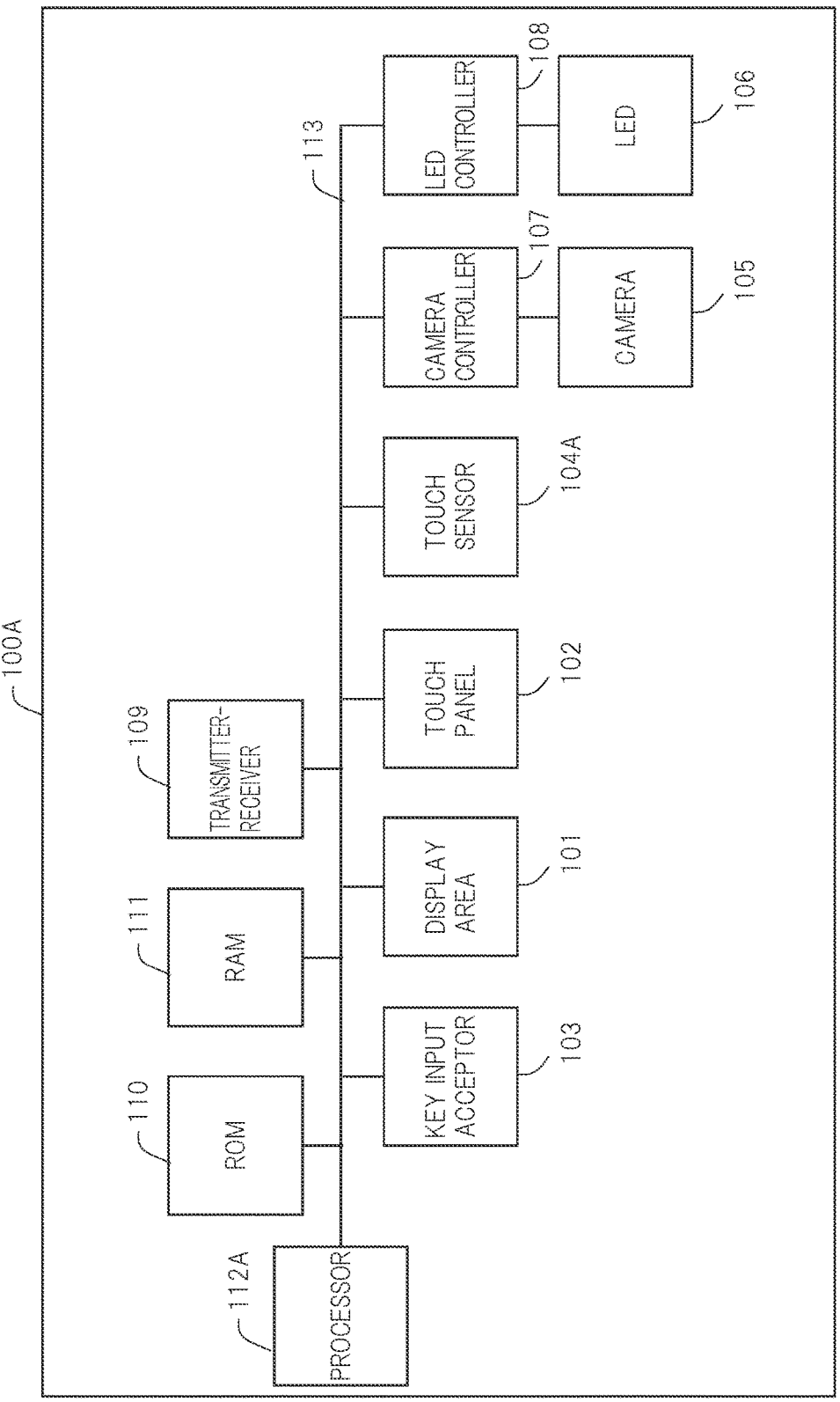
FIG. 11 is a block diagram showing the configuration of mobile phone 100A.

FIG. 11 is a block diagram showing a configuration of mobile phone 100A. Note that, in FIG. 11, the same reference signs are assigned to configurational elements identical to those shown in FIGS. 10A, 10B and 2.

In FIG. 11, mobile phone 100A includes display 101, touch panel 102, key input acceptor 103, touch sensor 104A, camera 105, LED 106, camera controller 107, LED controller 108, transmitter-receiver 109, ROM 110, RAM 111, processor 112A, and bus 113.

ROM 110 stores various control programs, such as for image analysis, touch panel control, touch sensor control, camera control, and LED control, executed by processor 112A, and determination programs for determining an input operation using detection results of touch panel 102 and touch sensor 104A.

RAM 111 is a region where control programs and data that are required by processor 112A for executing processes are deployed.

Processor 112A is an example of control means.

Processor 112A includes, for instance, a CPU and a DSP. Processor 112A is connected to each element in mobile phone 100A via bus 113.

Processor 112A achieves various functions by reading and executing programs in ROM 110.

Processor 112A sets a reference position on front surface 100Aa or rear surface 100Ab in response to a touch operation on touch sensor 104A of rear surface 100Ab (hereinafter, also referred to as "a touch operation on rear surface 100Ab"). For instance, processor 112A sets a reference position in response to a touch operation on rear surface 100Ab.

In this exemplary embodiment, processor 112A sets a position (hereinafter, referred to as an "opposite position") on touch panel 102 opposite to touch sensor 104A as a reference position. Hereinafter, the reference position set on touch panel 102 is also referred to as a "virtual touch position". The virtual touch position is not limited to the opposite position. Alternatively, the virtual touch position may be a position deviating from the opposite position.

After setting the virtual touch position (reference position), processor 112A controls the operation of mobile phone 100A on the basis of change in the relative positional relationship between the virtual touch position and an actual touch position on front surface 100a.

In this exemplary embodiment, processor 112A sets the virtual touch position on the basis of an output of touch panel 104A that represents a touch operation on touch sensor 104A by a user.

Processor 112A identifies the relative positional relationship between the actual touch position on front surface 100a and the virtual position on the basis of the output of touch panel 102 that represents the touch position on touch panel 102 by the user and the virtual touch position.

Processor 112A identifies an input on mobile phone 100A on the basis of the identified relative positional relationship (e.g., change in relative positional relationship). Processor 112A controls the operation of mobile phone 100A on the basis of the identified input.

Processor 112A controls the operation of mobile phone 100A on the basis of the temporal difference between the timing when touch panel 102 detects a touch position and the timing when touch sensor 104A detects a touch operation.

Next, operation is described.

Figure 12:
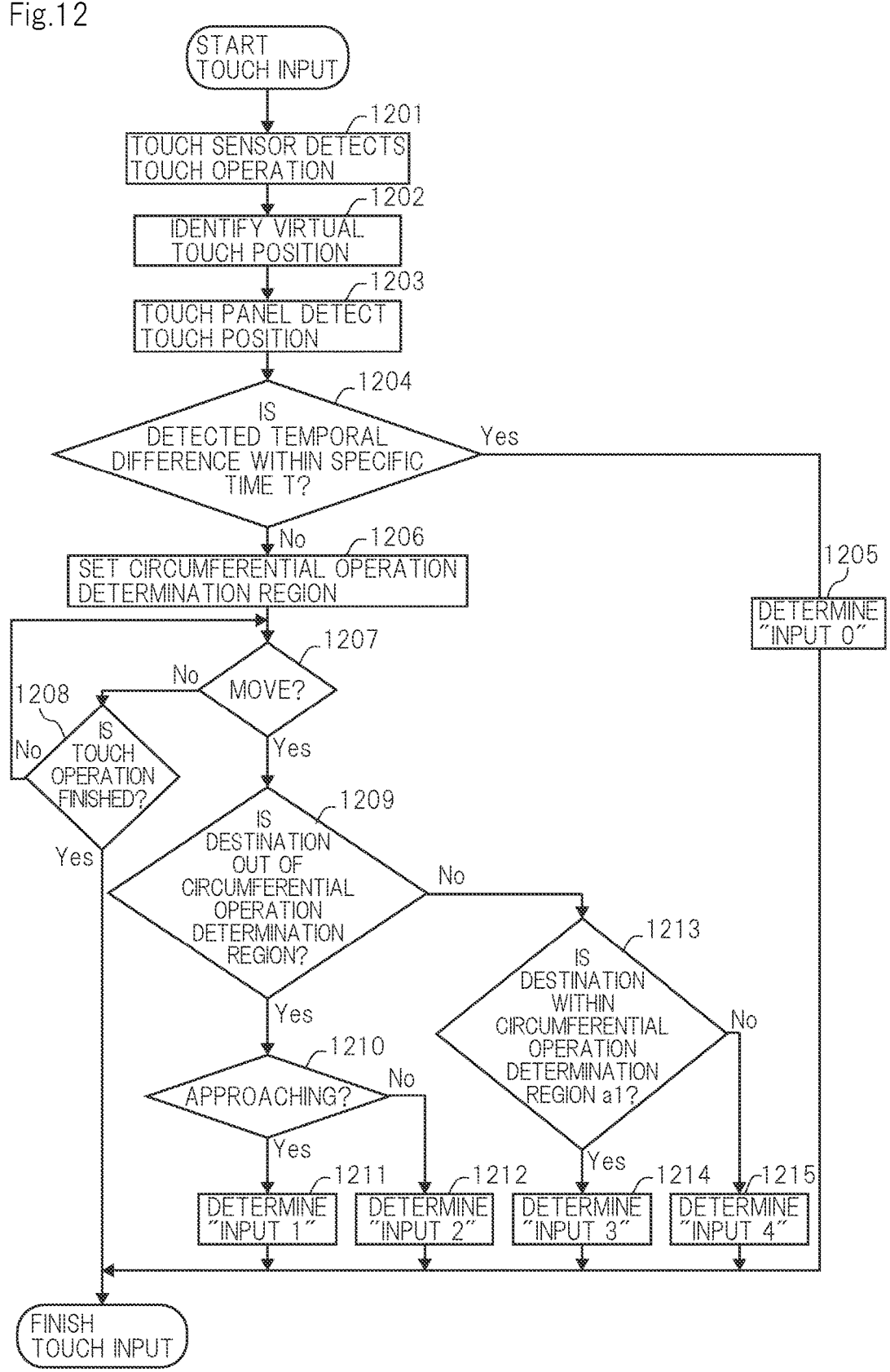
FIG. 12 is a flowchart for illustrating the operation of mobile phone 100A.

FIG. 12 is a flowchart for illustrating the operation of mobile phone 100A.

Hereinafter, the operation of mobile phone 100A in the case where a user touches touch sensor 104A with the left index finger while holding mobile phone 100A with his/her left hand, and performs a touch operation on touch panel 102 with the left thumb, is described.

Note that a touch on touch sensor 104A and a touch on touch panel 102 are not limited to the case where an operation is performed with the left index finger and the left thumb respectively. The touches may be appropriately changed.

When a touch operation on touch sensor 104A is performed, touch sensor 104A detects a touch operation in step 1201. Touch sensor 104A notifies processor 112A of the detection result of a touch operation.

When accepting the detection result of a touch operation from touch sensor 104A, processor 112A sets a virtual touch position on touch panel 102 in step 1202.

Figure 13:
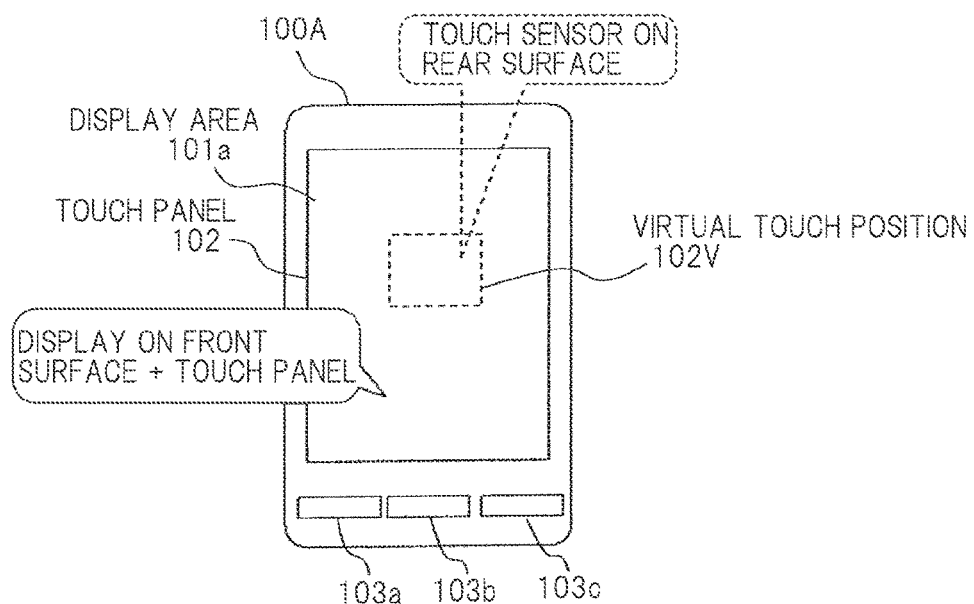
FIG. 13 is a diagram showing an example of virtual touch position 102V.

FIG. 13 is a diagram showing an example of virtual touch position 102V set on touch panel 102.

Processor 112A calculates the barycentric point of virtual touch position 102. The barycentric point of virtual touch position 102 is an example of the reference position.

When a touch operation is performed on touch panel 102, touch panel 102 detects the touched position (hereinafter, referred to as a "touch point") on front surface 100Aa in step 1203. Touch panel 102 notifies processor 112A of the detection result of the touch point. Note that, in FIG. 12, step 1203 is arranged after step 1201. Alternatively, step 1203 may be arranged before step 1201.

Upon accepting the detection result of the touch point from touch panel 102 and the detection result of the touch operation from touch sensor 104A, processor 112A determines whether or not the temporal difference (hereinafter, referred to as "detected temporal difference") between the acceptance timing of the detection result of the touch point and acceptance timing of the detection result of the touch operation is within specific time T in step 1204.

Specific time T is, for instance, 0.5 seconds. Note that specific time T is not limited to 0.5 seconds but may be appropriately changed. Note that specific time T is preset in processor 112A.

The detected temporal difference represents the temporal difference between the timing when touch panel 102 detects the touch point and the timing when touch sensor 104A detects the touch operation.

Note that, in step 1204, processor 112A determines whether or not the detected temporal difference is within specific time T and whether or not the touch point on touch panel 102 is in contact with the virtual touch position.

Figure 14:
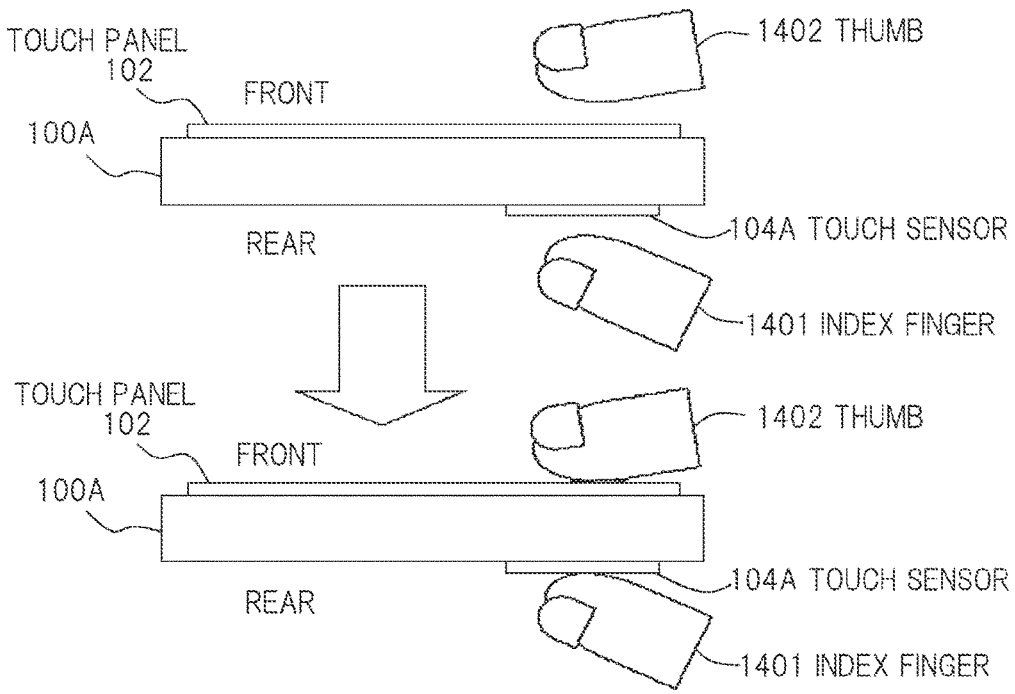
FIG. 14 is a diagram showing an example of a situation where a detected temporal difference is within specific time T and a touch point on touch panel 102 is in contact with a virtual touch position.

FIG. 14 is a diagram showing an example of a situation where the detected temporal difference is within specific time T and the touch point on touch panel 102 is in contact with the virtual touch position.

In FIG. 14, it is assumed that the temporal difference between the touch on touch sensor 104A using left index finger 1401 and the touch on the virtual touch position using left thumb 1402 is within specific time T.

In step 1204, if the detected temporal difference is within specific time T, processor 112A determines in step 1205 that "input 0" (e.g., screen shot input) has been input. For instance, if processor 112A determines that a screen shot input has been input, this processor stores image information representing the display screen of display area 101a.

Meanwhile, in step 1204, if the detected temporal difference is longer than specific time T, processor 112A sets a circumferential operation determination region on touch panel 102 in step 1206.

The circumferential operation determination region is used for determining whether or not the touch point moves on the circumference of a circle that has the radius of the distance (hereinafter, referred to as the "distance between touches") from the barycentric point of the virtual touch position to the touch point and is centered on the barycentric point of the virtual touch position.

For instance, in step 1206, the following processes are performed.

First, processor 112A sets, on touch panel 102, a first line inclined from the line connecting the touch point and the barycentric point of the virtual touch position by a prescribed angle clockwise centered on the touch point, and a second line inclined from the line connecting the touch point and the barycentric point of the virtual touch position by a specific angle counterclockwise centered on the touch point.

The prescribed angle and the specific angle are larger than 0 degrees and less than 90 degrees, and are, for instance, 60 degrees. Note that the prescribed angle and the specific angle are not limited to 60 degrees but may be appropriately changed. The prescribed angle may be the same as or different from the specific angle.

Subsequently, processor 112A divides touch panel 102 into four regions by the first line and the second line, which are boundaries.

Subsequently, processor 112A sets two regions in which the line connecting the touch point and the barycentric point of the virtual touch position does not pass, among four regions, as circumferential operation determination regions a1 and a2 respectively.

After step 1206 is finished, processor 112A then determines in step 1207 whether or not the touch point on touch panel 102 has moved on the basis of the output of touch panel 102.

In step 1207, if the touch point on touch panel 102 has not moved, processor 112A determines in step 1208 whether or not at least any of touch operations has been finished on the basis of the output of touch panel 102 and the output of touch sensor 104A.

If it is determined in step 1208 that at least one of the touch operations has been finished, processor 112A finishes the touch input determination process.

Meanwhile, if it is determined in step 1208 that no touch operation has been finished, processor 112A returns the process to step 1207.

If it is determined in step 1207 that the touch point on touch panel 102 has moved, processor 112A determines in step 1209 whether or not the destination of the touch point is out of circumferential operation determination region a0 (a region where circumferential operation determination region a1 and circumferential operation determination region a2 are combined).

If it is determined in step 1209 that the destination of the touch point is out of circumferential operation determination region a0, processor 112A determines in step 1210 whether or not the movement of the touch point is movement that is approaching the virtual touch position.

Figure 15:
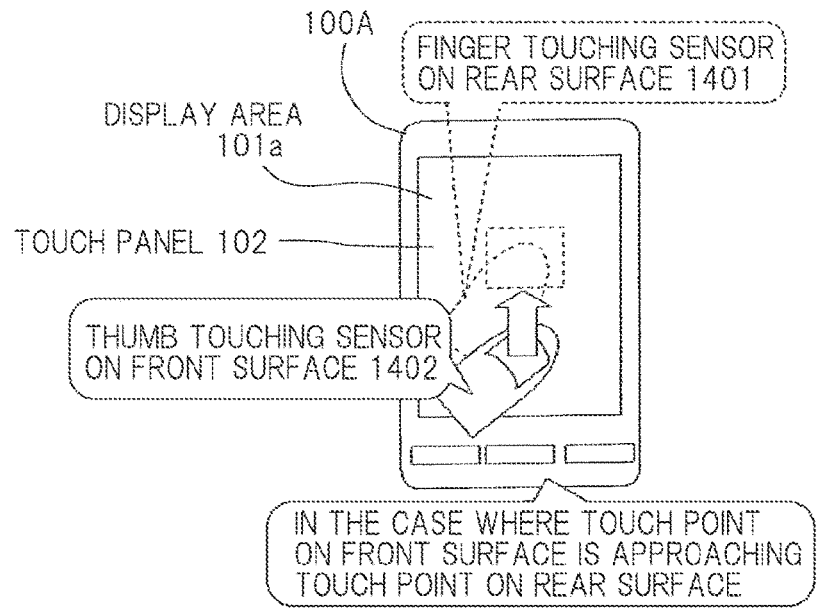
FIG. 15 is a diagram showing an example of a situation where the touch point is approaching the virtual touch position.

FIG. 15 is a diagram showing an example of a situation where the touch point is approaching the virtual touch position.

If the movement of the touch point is movement approaching the virtual touch point in step 1210, processor 112A determines in step 1211 that "input 1" (e.g., input for reduction) has been input. For instance, if processor 112A determines that the input for reduction has been input, this processor reduces the display in display area 101a. In this case, the larger the amount of movement of the touch point, the greater can processor 112A emphasize the reduction ratio.

Meanwhile, in step 1210, if the movement of the touch point is not movement that is approaching the virtual touch position, i.e., the movement of the touch point is movement away from the virtual touch position, processor 112A determines in step 1212 that "input 2" (e.g., input for enlargement) has been input.

Figure 16:
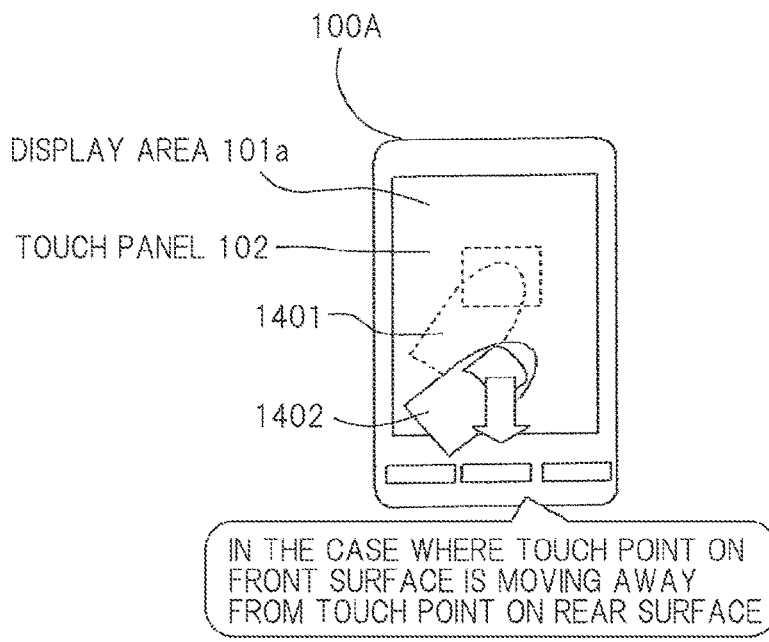
FIG. 16 is a diagram showing an example of a situation where the touch point is moving apart from the virtual touch position.

FIG. 16 is a diagram showing an example of a situation where the touch point moves away from the virtual touch position.

For instance, if processor 112A determines that an input for enlargement has been input, this processor enlarges the display in display area 101a. In this case, the larger the amount of movement of the touch point, the greater can processor 112A increase the enlargement ratio.

If the destination of the touch point is included in circumferential operation determination region a0 in step 1209, processor 112A determines in step 1213 whether or not the destination of the touch point is included in circumferential operation determination region a1.

If the destination of the touch point is included in circumferential operation determination region a1 in step 1213, processor 112A determines in step 1214 that "input 3" (e.g., an input for increasing brightness) has been input. For instance, if processor 112A determines that an input for increasing brightness has been input, this processor increases the brightness of display area 101a. In this case, the larger the amount of movement of the touch point, the greater can processor 112A increase the brightness.

However, if the destination of the touch point is not included in circumferential operation determination region a1 in step 1213, i.e., the destination of the touch point is included in circumferential operation determination region a2, processor 112A determines in step 1215 that "input 4" (e.g., an input for reducing brightness) has been input. For instance, if processor 112A determines that an input for reducing brightness has been input, this processor reduces the brightness of the display in display area 101a. In this case, the larger the amount of movement of the touch point, the greater can processor 112A reduce the brightness of display.

Figure 17:
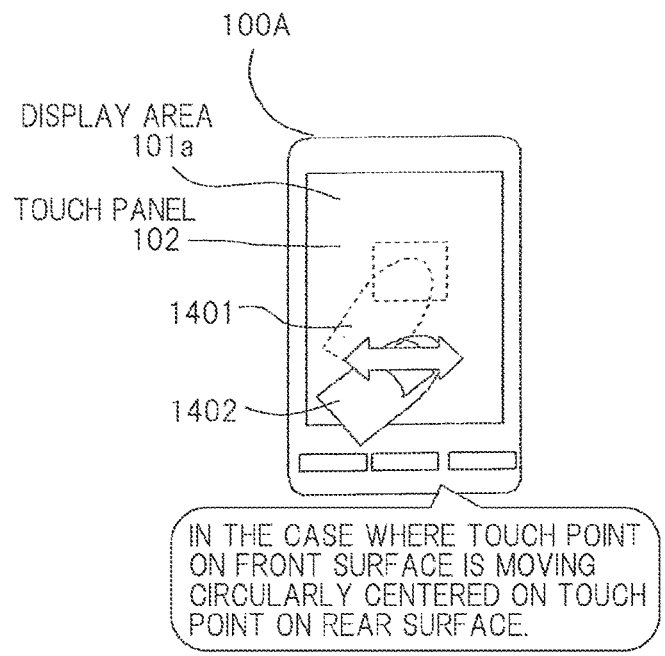
FIG. 17 is a diagram showing an example of a situation where the destination of the touch point is included in circumferential operation determination region a0.

FIG. 17 is a diagram showing an example of a situation where the destination of the touch point is included in circumferential operation determination region a0 (the region where circumferential operation determination region a1 and circumferential operation determination region a2 are combined).

Next, the advantageous effects of this exemplary embodiment are described.

According to this exemplary embodiment, processor 112A identifies an input on mobile phone 100 on the basis of a change in the relative positional relationship between the virtual touch position set by a touch operation on touch sensor 104A and the touch position on touch panel 102 (e.g., both the positions move close or apart, the trajectory of movement of the touch position on touch panel 102 draws a part (arc) of a circle centered on the virtual touch position).

Accordingly, what is called two-point touch input operation can be performed with one hand, thereby increasing the types of input methods.

Furthermore, processor 112A controls the operation of mobile phone 100A on the basis of the detected temporal difference.

Accordingly, the operation of mobile phone 100A can be controlled in response to the temporal difference between touches on touch panel 102 and touch sensor 104A that are provided on different surfaces. Thus, a two-point touch input operation can be performed with one hand. Note that in the first exemplary embodiment, processor 112 may control the operation of mobile phone 100A in response to the temporal difference between touches on the respective two touch panels.

Furthermore, in this exemplary embodiment, if the detected temporal difference is within specific time T, processor 112A determines that a prescribed input (e.g., screen shot input) has been accepted, and controls the operation of mobile phone 100A in response to the prescribed input.

Accordingly, for instance, when touches on touch panel 102 and touch sensor 104A are performed simultaneously or substantially simultaneously, e.g., an operation of sandwiching mobile phone 100A is performed, mobile phone 100A can be caused to perform a prescribed operation.

Note that, instead of touch sensor 104A, a touch panel may be adopted.

Figure 18:
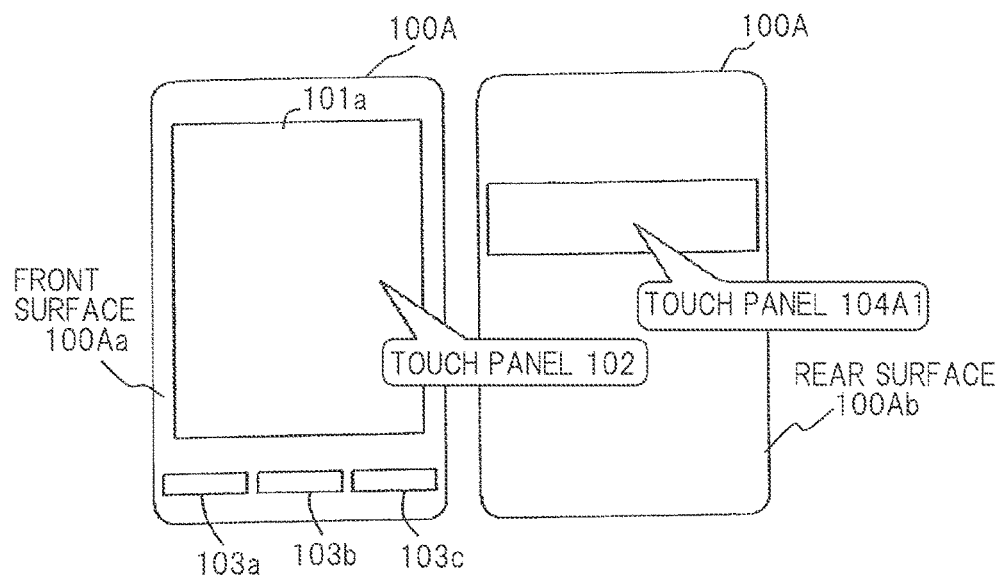
FIG. 18 is a diagram showing an example of mobile phone 100A that includes touch panel 104A1 instead of touch sensor 104A.

FIG. 18 is a diagram showing an example of mobile phone 100A including touch panel 104A1 instead of touch sensor 104A. In FIG. 18, the same reference signs are assigned to configurational elements identical to those shown in FIG. 10A or 10B.

Instead of touch sensor 104A, touch panel 104A1 having a wider detection region than touch sensor 104A is adopted, thereby allowing the detection region for a touch operation on rear surface 100Ab to be widened. In this case, it is preferred that the virtual touch position is set at a position identical to that of image touch position 102V shown in FIG. 13.

When touch sensor 104A or touch panel 104A1 detects a touch operation, processor 112A may display, on display area 101a of display 101, that touch sensor 104A or touch panel 104A1 detects the touch operation, that a touch operation on touch panel 102 is combined with a touch operation on the virtual touch position and dealt with as two-point touch operation, that the virtual touch position is touched, and/or the virtual touch position.

Touch sensor 104A may be provided not on rear surface 100Ab, but on a surface other than front surface 100Aa of mobile phone 100A, e.g., on a side surface of mobile phone 100A. Alternatively, this sensor may be provided on a projection for holding or a grip surface provided on rear surface 100Ab.

In this case, it is preferred that processor 112A set a predetermined position on touch panel 102 as a virtual touch position, and display the set virtual touch position in display area 101a.

Also in the case where touch sensor 104A is provided on rear surface 100Ab, processor 112A may set a predetermined position on touch panel 102 as a virtual touch position, and display the virtual touch position on display area 101a.

Alternatively, a hard switch may be adopted instead of touch sensor 104A. In the first exemplary embodiment, instead of touch panel 104, a hard switch may be adopted that is for detecting an operation position and provided on a matrix.

Figure 19:
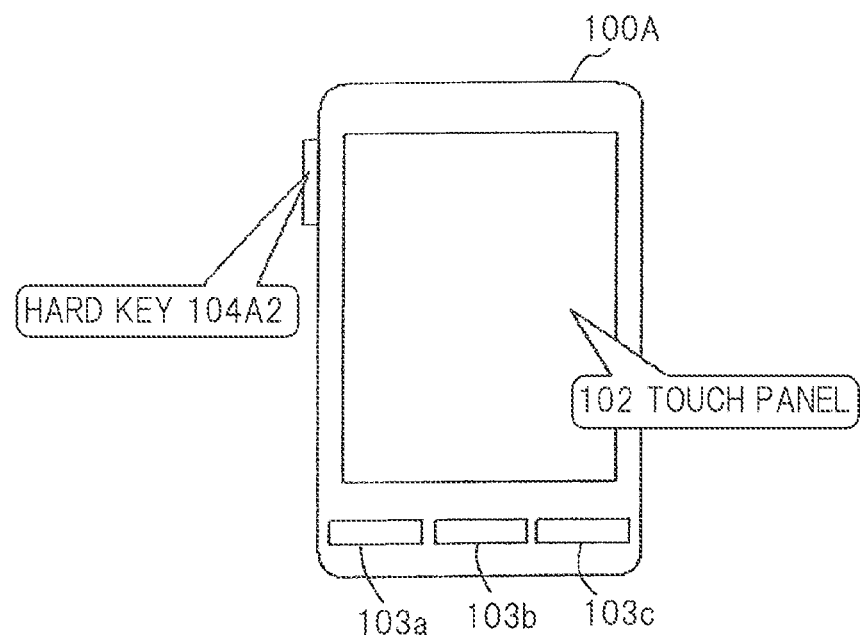
FIG. 19 is a diagram showing an example where hard key 104A2, which is a hard switch, is provided on a side surface of mobile phone 100A, instead of touch sensor 104A.

FIG. 19 is a diagram showing an example where, instead of touch sensor 104A, hard key 104A2, which is a hard switch, is provided on a side surface of mobile phone 100A.

The shape of the circumferential operation determination region may be appropriately changed. For instance, processor 112A may set a circumferential operation determination region as described below.

Processor 112A may set, on touch panel 102, a reference circle, which is used for making a determination, having a radius that is the distance between the barycentric point of the virtual touch position and the touch point centered on the barycentric point of the virtual touch position. Subsequently, processor 112A sets a region within a specific distance from the circumference of the reference circle, which is used for making a determination, as a circumferential operation determination region. The specific distance is, for instance, 3 mm. The specific distance is not limited to 3 mm. The distance may be appropriately changed. In this case, in step 1207 shown in FIG. 12, it is preferred that processor 112A determine whether or not the touch point on touch panel 102 moves beyond the specific distance.

In the case where an annular circumferential operation determination region is set, the touch point can rotate about the barycentric point of the virtual touch position without deviating from the circumferential operation determination region. In the case where the touch point rotates about the barycentric point of the virtual touch position without deviating from the circumferential operation determination region, processor 112A may determine that a sequential operation of "input 3" or "input 4" is performed. Processor 112A may increase and reduce the brightness of display and increase and reduce the volume of a speaker, not shown, according to the rotational direction of the touch point.

Note that steps 1204 and 1205 may be omitted from among the processes shown in FIG. 12. Furthermore, steps 1206 to 1215 may be omitted from among the processes shown in FIG. 12.

All the processes shown in FIG. 12, processes that are shown in FIG. 12 but steps 1204 and 1205 are omitted therefrom, or processes that are shown in FIG. 12 but steps 1206 to 1215 are omitted therefrom may be performed by processor 112 in the first exemplary embodiment.

In this case, touch panel 104 shown in FIGS. 1A and 1B is adopted instead of touch sensor 104A1 shown in FIG. 13.

Third Exemplary Embodiment

Figure 20:
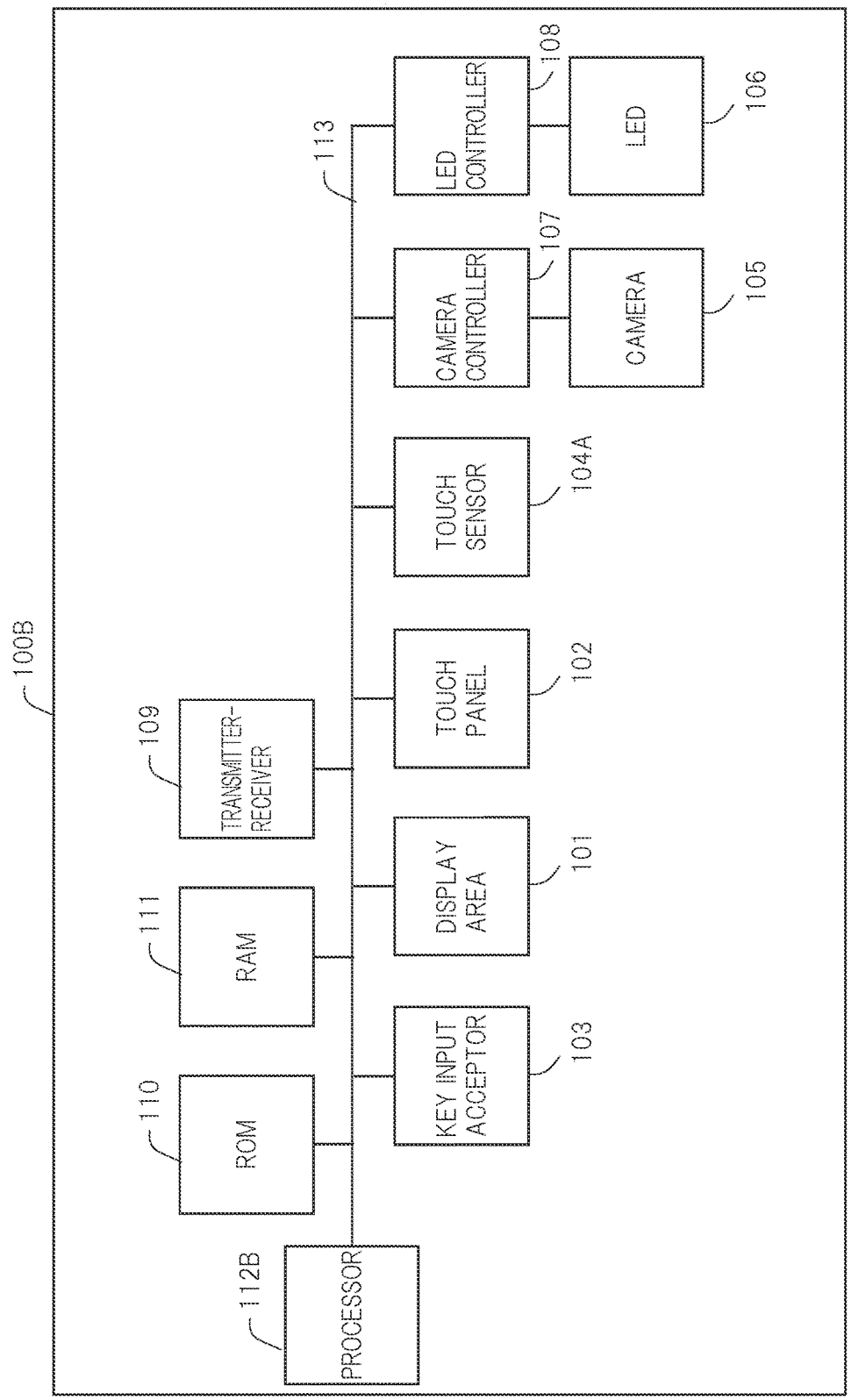
FIG. 20 is a block diagram showing a configuration of mobile phone 100B, which is an example of an electronic device of a third exemplary embodiment.

FIG. 20 is a block diagram showing a configuration of mobile phone 100B, which is an example of an electronic device of a third exemplary embodiment. Note that, in FIG. 20, the same reference signs are assigned to configurational elements identical to those shown in FIG. 11.

Mobile phone 100B of the third exemplary embodiment is different from mobile phone 100A of the second exemplary embodiment in that processor 112B is included instead of processor 112A.

Mobile phone 100B of the third exemplary embodiment is hereinafter described mainly regarding differences from mobile phone 100A of the second exemplary embodiment.

Processor 112B is an example of control means.

Processor 112B is different from processor 112A in a method of setting a virtual touch position and a method of setting a touch point.

In a situation where touch sensor 104A is detecting a continuous touch operation (hereinafter, referred to as "continuous detection situation"), processor 112B sets a touch point detected first by touch panel 102, as a virtual touch position.

In a continuous detection situation, after the first touch operation on touch panel 102 is finished, processor 112B controls the operation of mobile phone 100B on the basis of the relative positional relationship between a touch point newly detected by touch panel 102 (hereinafter, also referred to as "new touch point") and a virtual touch position. The new touch point is a touch point detected secondarily by touch panel 102 in a continuous detection situation.

Note that processor 112B finishes setting of the virtual touch position, as the continuous detection situation is finished.

In this exemplary embodiment, processor 112B controls the operation of mobile phone 100B on the basis of change in the relative positional relationship between the virtual touch position and the new touch point.

For instance, after processor 112B sets the virtual touch position and detects the new touch point, this processor executes the processes on and after step 1204 shown in FIG. 12. Note that the new touch point is used as a touch point detected in step 1203 of FIG. 12.

This exemplary embodiment allows one-handed two-point touch operation.

In these exemplary embodiments, mobile phones 100, 100A and 100B may be a computer. The computers read and execute programs stored in computer-readable recording media, thereby executing functions held by mobile phones 100, 100A and 100B.

In each of the exemplary embodiments having been described above, the configurations shown in the diagrams are only examples. The present invention is not limited to these configurations.

The whole or part of the exemplary embodiments disclosed above can be described as, but not limited to, the following supplementary notes.

(Supplementary note 1) An electronic device accepting an input and executing an operation, the device including:

first detection means that detects a touch position on a first surface among surfaces included on the electronic device;

second detection means that detects a touch operation on a second surface that is different from the first surface among the surfaces included on the electronic device; and control means that sets a reference position on the first surface or the second surface in response to the touch operation on the second surface, and controls the operation of the electronic device on the basis of a relative positional relationship between the reference position and the touch position on the first surface.

(Supplementary note 2) The electronic device according to Supplementary note 1,
wherein the second detection means detects a touch position on the second surface, as the touch operation, and
the control means sets the reference position in response to the touch position on the second surface.

(Supplementary note 3) The electronic device according to Supplementary note 2,
wherein the control means sets the touch position on the second surface, as the reference position.

(Supplementary note 4) The electronic device according to any one of Supplementary notes 1 to 3,
wherein the control means identifies an input into the electronic device on the basis of the relative positional relationship, and controls the operation of the electronic device on the basis of the identified input.

(Supplementary note 5) The electronic device according to any one of Supplementary notes 1 to 4,
wherein the second surface is a rear surface opposite to the first surface.

(Supplementary note 6) The electronic device according to any one of Supplementary notes 1 to 5,
wherein the first detection means is a first touch panel provided on the first surface, and
the second detection means is a second touch panel, a touch sensor or a hard switch that is provided on the second surface.

(Supplementary note 7) The electronic device according to Supplementary note 6,
wherein a screen is provided on the first surface, and
the first touch panel is provided at least in a region adjacent to the screen on the first surface.

(Supplementary note 8) The electronic device according to Supplementary note 6 or 7,
wherein a screen is provided on the first surface, and
the first touch panel is provided at least on the screen.

(Supplementary note 9) The electronic device according to any one of Supplementary notes 1 to 8, further including
storing means that stores the reference position set by the control means,
wherein the control means controls the operation of the electronic device on the basis of a relative positional relationship between the touch position on the first surface and the reference position in the storing means.

(Supplementary note 10) The electronic device according to any one of Supplementary notes 1 to 9,
wherein the control means controls the operation of the electronic device on the basis of change in the relative positional relationship.

(Supplementary note 11) The electronic device according to any one of Supplementary notes 1 to 10,
wherein the control means further controls the operation of the electronic device on the basis of a temporal difference between the timing when the first detection means detects the touch position on the first surface and the timing when the second detection means detects the touch operation on the second surface.

(Supplementary note 12) The electronic device according to Supplementary note 11,
wherein if the temporal difference is within a specific time, the control means determines that a prescribed input has been accepted, and controls the operation of the electronic device on the basis of the prescribed input.

(Supplementary note 13) The electronic device according to any one of Supplementary notes 1 to 12,
further comprising display means including a screen that is provided on the first surface, and
when the second detection means detects the touch operation on the second surface, the display means displays that the touch operation on the first surface is used together with a touch operation on the reference position, or that the reference position is touched.

(Supplementary note 14) An electronic device accepting an input and executing an operation, the device including:
first detection means that detects a touch operation on a first surface among surfaces included on the electronic device;
second detection means that detects a touch operation on a second surface that is different from the first surface among the surfaces included on the electronic device; and
control means that controls the operation of the electronic device on the basis of a temporal difference between timing when the first detection means detects the touch operation on the first surface and timing when the second detection means detects the touch operation on the second surface.

(Supplementary note 15) The electronic device according to Supplementary note 14,
wherein if the temporal difference is within a specific time, the control means determines that a prescribed input has been accepted, and controls the operation of the electronic device on the basis of the prescribed input.

(Supplementary note 16) An electronic device accepting an input and executing an operation, the device including:
first detection means that detects a touch position on a first surface among surfaces included on the electronic device;
second detection means that detects a touch operation on a second surface that is different from the first surface among the surfaces included on the electronic device; and
control means that sets, as a reference position, a touch position on the first surface detected first by the first detection means in a continuous detection situation where the second detection means is detecting a continuous touch operation on the second surface, and controls the operation of the electronic device on the basis of a relative positional relationship between a touch position on the first surface secondarily detected by the first detection means in the continuous detection situation and the reference position.

(Supplementary note 17) An operational control method in an electronic device accepting an input and executing an operation, the method including:
detecting a touch position on a first surface among surfaces included on the electronic device;
detecting a touch operation on a second surface that is different from the first surface among the surfaces included on the electronic device; and
setting a reference position on the first surface or the second surface in response to the touch operation on the second surface, and controlling the operation of the electronic device on the basis of a relative positional relationship between the reference position and the touch position on the first surface.

(Supplementary note 18) An operational control method in an electronic device accepting an input and executing an operation, the method including:
detecting a touch operation on a first surface among surfaces included on the electronic device;
detecting a touch operation on a second surface that is different from the first surface among the surfaces included on the electronic device; and
controlling the operation of the electronic device on the basis of a temporal difference between timing of detecting the touch operation on the first surface and timing of detecting the touch operation on the second surface.

(Supplementary note 19) An operational control method in an electronic device accepting an input and executing an operation, the method including:

detecting a touch position on a first surface among surfaces included on the electronic device;

detecting a touch operation on a second surface that is different from the first surface among the surfaces included on the electronic device; and setting, as a reference position, the touch position on the first surface detected first in a continuous detection situation of detecting a continuous touch operation on the second surface, and controlling the operation of the electronic device on the basis of a relative positional relationship between a touch position on the first surface secondarily detected in the continuous detection situation and the reference position.

(Supplementary note 20) A computer-readable recording medium storing a program causing a computer to execute:

a first detection procedure of detecting a touch position on a first surface among surfaces included on the computer;

a second detection procedure of detecting a touch operation on a second surface that is different from the first surface among the surfaces included on the computer; and a control procedure of setting a reference position on the first surface or the second surface in response to the touch operation on the second surface, and controlling the operation of the electronic device on the basis of a relative positional relationship between the reference position and the touch position on the first surface.

(Supplementary note 21) A computer-readable recording medium storing a program causing a computer to execute:

a first detection procedure of detecting a touch position on a first surface among surfaces included on the computer;

a second detection procedure of detecting a touch operation on a second surface that is different from the first surface among the surfaces included on the computer; and a control procedure of controlling the operation of the electronic device on the basis of the temporal difference between timing of detecting a touch operation on the first surface and timing of detecting the touch operation on the second surface.

(Supplementary note 22) A computer-readable recording medium storing a program causing a computer to execute:

a first detection procedure of detecting a touch position on a first surface among surfaces included on the computer;

a second detection procedure of detecting a touch operation on a second surface that is different from the first surface among the surfaces included on the computer; and a control procedure of setting, as a reference position, the touch position on the first surface detected first in a continuous detection situation of detecting a continuous touch operation on the second surface, and controlling the operation of the electronic device on the basis of a relative positional relationship between a touch position on the first surface secondarily detected in the continuous detection situation and the reference position.

This application claims priority based on Japanese Patent Application No. 2011-259969 filed on Nov. 29, 2011 and Japanese Patent Application No. 2012-213881 filed on Sep. 27, 2012, the disclosure of which is incorporated herein by reference in its entirety.

REFERENCE SIGNS LIST 100, 100A, 100B mobile phone
100a, 100Aa front surface
100a1 region
100b, 100Ab rear surface
101 display
101a display area
102 touch panel
103 key input acceptor
103a clear key
103b enter key
103c menu key
104 touch panel
104A touch sensor
104A1 touch panel
105 camera
106 LED
107 camera controller
108 LED controller
109 transmitter-receiver
110 ROM
111 RAM
112, 112A, 112B processor

What is claimed is:

1. An electronic device accepting an input and executing an operation, the device comprising:

a first detection unit that detects a touch position on a first surface among surfaces included on said electronic device;

a second detection unit that detects a touch operation on a second surface that is different from the first surface among the surfaces included on the electronic device; and a control unit that sets a reference position on the first surface or the second surface in response to the touch operation on the second surface, and controls the operation of said electronic device on the basis of a relative positional relationship between the reference position and the touch position on the first surface, wherein:

XY-coordinates are defined on the first and second surfaces, the XY-coordinates on the second surface being arranged so as to have a mirror symmetrical relationship to the XY-coordinates on the first surface; and the control unit detects a touch position where the second surface is touched, sets a region whose center is located at an identified point on the first surface that is identified with reference to coordinates identical to the coordinates of the touch position on the second surface, and divides the region into a plurality of sections that are centered on the identified point to set a plurality of areas, a touch input being accepted on each area.

2. The electronic device according to claim 1, wherein said control unit controls the operation of said electronic device on the basis of change in the relative positional relationship.

3. The electronic device according to claim 1, wherein the second detection unit detects a touch position on the second surface, as the touch operation, and the control unit sets the reference position in response to the touch position on the second surface.

4. The electronic device according to claim 3, wherein the control unit sets the touch position on the second surface, as the reference position.

5. The electronic device according to claim 1, wherein the control unit identifies an input into the electronic device on the basis of the relative positional relationship, and controls the operation of the electronic device on the basis of the identified input.

6. The electronic device according to claim 1,
wherein the second surface is a rear surface opposite to the first surface.

7. The electronic device according to claim 1,
wherein the first detection unit is a first touch panel provided on the first surface, and
the second detection unit is a second touch panel, a touch sensor or a hard switch that is provided on the second surface.

8. The electronic device according to claim 7,
wherein a screen is provided on the first surface, and
the first touch panel is provided at least in a region adjacent to the screen on the first surface.

9. The electronic device according to claim 7,
wherein a screen is provided on the first surface, and
the first touch panel is provided at least on the screen.

10. The electronic device according to claim 1, further including
a storing unit that stores the reference position set by the control unit,
wherein the control unit controls the operation of the electronic device on the basis of a relative positional relationship between the touch position on the first surface and the reference position in the storing unit.

11. The electronic device according to claim 1,
wherein the control unit further controls the operation of the electronic device on the basis of a temporal difference between timing when the first detection unit detects the touch position on the first surface and timing when the second detection unit detects the touch operation on the second surface.

12. The electronic device according to claim 11,
wherein if the temporal difference is within a specific time, the control unit determines that a prescribed input has been accepted, and controls the operation of the electronic device on the basis of the prescribed input.

13. The electronic device according to claim 1,
further comprising a display unit including a screen that is provided on the first surface, and
when the second detection unit detects the touch operation on the second surface, the display unit displays that the touch operation on the first surface is used together with a touch operation on the reference position, or that the reference position is touched.

14. An electronic device accepting an input and executing an operation, the device comprising:
a first detection unit that detects a touch operation on a first surface among surfaces included on said electronic device;
a second detection unit that detects a touch operation on a second surface that is different from the first surface among the surfaces included on said electronic device; and
a control unit that controls the operation of said electronic device on the basis of a temporal difference between timing when said first detection unit detects the touch operation on the first surface and timing when said second detection unit detects the touch operation on the second surface,
wherein:
XY-coordinates are defined on the first and second surfaces, the XY-coordinates on the second surface being arranged so as to have a mirror symmetrical relationship to the XY-coordinates on the first surface; and
the control unit detects a touch position where the second surface is touched, sets a region whose center is located at an identified point on the first surface that is identified with reference to coordinates identical to the coordinates of the touch position on the second surface, and divides the region into a plurality of sections that are centered on the identified point to set a plurality of areas, a touch input being accepted on each area.

15. The electronic device according to claim 14,
wherein if the temporal difference is within a specific time, the control unit determines that a prescribed input has been accepted, and controls the operation of the electronic device on the basis of the prescribed input.

16. An electronic device accepting an input and executing an operation, the device comprising:
a first detection unit that detects a touch position on a first surface among surfaces included on said electronic device;
a second detection unit that detects a touch operation on a second surface that is different from the first surface among the surfaces included on said electronic device; and
a control unit that sets, as a reference position, a touch position on the first surface detected first by said first detection unit in a continuous detection situation where said second detection unit is detecting a continuous touch operation on the second surface, and controls the operation of said electronic device on the basis of a relative positional relationship between a touch position on the first surface secondarily detected by said first detection unit in the continuous detection situation and the reference position,
wherein:
XY-coordinates are defined on the first and second surfaces, the XY-coordinates on the second surface being arranged so as to have a mirror symmetrical relationship to the XY-coordinates on the first surface; and
the control unit detects a touch position where the second surface is touched, sets a region whose center is located at an identified point on the first surface that is identified with reference to coordinates identical to the coordinates of the touch position on the second surface, and divides the region into a plurality of sections that are centered on the identified point to set a plurality of areas, a touch input being accepted on each area.

\* \* \* \* \*